United States Patent
Huang et al.

(10) Patent No.: US 11,025,764 B2
(45) Date of Patent: Jun. 1, 2021

(54) METHOD AND SYSTEM FOR REDUCING CURRENT NOISE OF TOUCH TERMINAL

(71) Applicant: SHANGHAI AVIC OPTO ELECTRONICS CO., LTD., Shanghai (CN)

(72) Inventors: Zhengyuan Huang, Shanghai (CN); Xu Yang, Shanghai (CN); Xupeng Wang, Shanghai (CN); Zhi Zheng, Shanghai (CN); Changchao Liu, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/358,728

(22) Filed: Mar. 20, 2019

(65) Prior Publication Data

US 2019/0278419 A1    Sep. 12, 2019

(30) Foreign Application Priority Data

Dec. 19, 2018  (CN) .......................... 201811566534.5

(51) Int. Cl.
*G06F 3/041* (2006.01)
*H04M 1/72454* (2021.01)
(Continued)

(52) U.S. Cl.
CPC .......... *H04M 1/6033* (2013.01); *G06F 3/011* (2013.01); *G06F 3/0416* (2013.01);
(Continued)

(58) Field of Classification Search
CPC ........... H04M 1/6033; H04M 1/72569; H04M 2250/22; H04M 1/72563; H04M 1/72519;
(Continued)

(56) References Cited

U.S. PATENT DOCUMENTS

| | | | | |
|---|---|---|---|---|
| 3,659,050 A | * | 4/1972 | Carlsson | H04M 1/6033 379/420.03 |
| 2002/0021278 A1 | * | 2/2002 | Hinckley | G06F 1/1626 345/156 |

(Continued)

FOREIGN PATENT DOCUMENTS

| | | |
|---|---|---|
| CN | 102905013 A | 1/2013 |
| CN | 107436666 A | 12/2017 |

(Continued)

*Primary Examiner* — Julie Anne Watko
(74) *Attorney, Agent, or Firm* — Kilpatrick Townsend & Stockton, LLP

(57) ABSTRACT

A method and a system for reducing current noise of a touch terminal are provided. The method includes: determining that a user receives a voice call via an earpiece of the touch terminal, and controlling the touch terminal to switch from a first touch scan frequency to a second touch scan frequency, where the second touch scan frequency is less than the first touch scan frequency. As can be seen, if the user receives the voice call via the earpiece of the touch terminal, the touch terminal is controlled to switch from the first touch scan frequency to the second touch scan frequency, to effectively reduce the current noise heard by the user by decreasing the touch scan frequency of the touch terminal, so that the periodic current noise is outside a frequency band perceptible to a human ear, thereby improving user experience when receiving the voice call.

6 Claims, 5 Drawing Sheets

(51) Int. Cl.
  *H04M 1/72484* (2021.01)
  *H04M 1/02* (2006.01)
  *H04M 1/60* (2006.01)
  *G06F 3/01* (2006.01)
  *H04M 1/72466* (2021.01)

(52) U.S. Cl.
  CPC .... *G06F 3/04166* (2019.05); *H04M 1/72454* (2021.01); *H04M 1/72484* (2021.01); *G06F 3/0412* (2013.01); *H04M 1/0241* (2013.01); *H04M 1/6041* (2013.01); *H04M 1/72466* (2021.01); *H04M 2250/22* (2013.01)

(58) Field of Classification Search
  CPC .... H04M 1/725; H04M 1/72511; H04M 1/72; H04M 1/68; H04M 1/607; H04M 1/6041; H04M 1/58; H04M 1/00; H04M 2250/00; H04M 1/72448; H04M 1/72484; H04M 1/72454; H04M 1/0241; H04M 1/72466; H04M 1/19; H04M 1/6075; G06F 3/017; G06F 3/0416; G06F 3/0412; G06F 3/041; G06F 3/03; G06F 3/011; G06F 3/01; G06F 3/00; G06F 3/0418
  See application file for complete search history.

(56) References Cited

U.S. PATENT DOCUMENTS

| | | | |
|---|---|---|---|
| 2008/0118054 A1* | 5/2008 | Mcardle | H04M 1/6033 379/388.02 |
| 2010/0124945 A1* | 5/2010 | Hwang | G06F 1/1613 455/566 |
| 2011/0193809 A1* | 8/2011 | Walley | G06F 3/044 345/173 |
| 2013/0029721 A1 | 1/2013 | Ma | |
| 2013/0153772 A1* | 6/2013 | Rossi | G01J 5/08 250/353 |
| 2014/0099992 A1* | 4/2014 | Burns | G06F 3/044 455/550.1 |
| 2015/0185958 A1* | 7/2015 | Park | G06F 3/0416 345/175 |
| 2019/0332220 A1* | 10/2019 | Huffman | G09G 5/003 |

FOREIGN PATENT DOCUMENTS

| | | | | |
|---|---|---|---|---|
| CN | 108170310 A | * | 6/2018 | |
| GB | 2479672 A | * | 10/2011 | ........... G10K 11/178 |

* cited by examiner

METHOD AND SYSTEM FOR REDUCING CURRENT NOISE OF TOUCH TERMINAL

The present application claims priority to Chinese Patent Application No. 201811566534.5, titled "METHOD AND SYSTEM FOR REDUCING CURRENT NOISE OF TOUCH TERMINAL", filed on Dec. 19, 2018 with the Chinese Patent Office, which is incorporated herein by reference in its entirety.

FIELD

The present disclosure relates to the field of touch terminals, and in particular to a method and a system for reducing current noise of a touch terminal.

BACKGROUND

With the development of communication technologies, terminal devices (such as cellphones) are more and more popular in daily life. Further, with advances in technology, most of the existing terminal devices are touch terminals, by which human-computer interaction can be achieved by a way of touching. However, the existing touch terminals have some defects. When receiving a voice call with an ear being close to an earpiece of the touch terminal, a user often hear a "hissing" current noise, which results in a decreased user experience when receiving the voice call.

SUMMARY

In view of this, a method and a system for reducing current noise of a touch terminal are provided according to the present disclosure, which can effectively reduce the current noise heard by a user when the user receives a voice call via an earpiece of the touch terminal, thereby improving the user experience when receiving the voice call.

A method for reducing current noise of a touch terminal is provided, which includes: determining that a user receives a voice call via an earpiece of the touch terminal; and controlling the touch terminal to switch from a first touch scan frequency to a second touch scan frequency, where the second touch scan frequency is less than the first touch scan frequency.

In one embodiment, the controlling the touch terminal to switch from the first touch scan frequency to the second touch scan frequency includes: acquiring a first switching signal, where the first switching signal indicates that the user receives the voice call via the earpiece of the touch terminal, and selecting, in response to the first switching signal, the second touch scan frequency, to control the touch terminal to switch from the first touch scan frequency to the second touch scan frequency.

In one embodiment, the second touch scan frequency is 0, and the controlling the touch terminal to switch from the first touch scan frequency to the second touch scan frequency includes: acquiring a first switching signal, where the first switching signal indicates that the user receives the voice call via the earpiece of the touch terminal, and controlling, in response to the first switching signal, the touch terminal to stop touch scan performed at the first touch scan frequency.

In one embodiment, the determining that the user receives the voice call via the earpiece of the touch terminal includes: determining that the user receives the voice call, and determining that the user receives the voice call via the earpiece of the touch terminal, if it is determined that a distance between the user and the touch terminal is less than a preset distance.

In one embodiment, the determining that the user receives the voice call via the earpiece of the touch terminal includes: determining that the user receives the voice call, and determining that the user receives the voice call via the earpiece of the touch terminal, if it is determined that the user does not turn on a speaker of the touch terminal.

In one embodiment, if it is determined that a distance between the user and the touch terminal is greater than a preset distance during reception of the voice call by the user via the earpiece of the touch terminal, the method further includes: determining that the user is distant from the touch terminal, and restoring the touch terminal to the first touch scan frequency.

In one embodiment, the restoring the touch terminal to the first touch scan frequency includes: acquiring a second switching signal, where the second switching signal indicates that the user is distant from the touch terminal, and selecting, in response to the second switching signal, the first touch scan frequency to control the touch terminal to switch from the second touch scan frequency to the first touch scan frequency.

Correspondingly, a system for reducing current noise of a touch terminal is provided, which includes a reception device and a switching device. The reception device is configured to determine whether a user receives a voice call via an earpiece of a touch terminal. The switching device is configured to control, if it is determined that the user receives the voice call via the earpiece of the touch terminal, the touch terminal to switch from a first touch scan frequency to a second touch scan frequency, where the second touch scan frequency is less than the first touch scan frequency.

In one embodiment, the switching device includes a first acquisition device and a first selection device. The first acquisition device is configured to acquire a first switching signal indicating that the user receives the voice call via the earpiece of the touch terminal. The first selection device is configured to select, in response to the first switching signal, the second touch scan frequency, to control the touch terminal to switch from the first touch scan frequency to the second touch scan frequency.

In one embodiment, the switching device includes a second acquisition device and a second selection device. The second acquisition device is configured to acquire a first switching signal indicating that the user receives the voice call via the earpiece of the touch terminal. The second selection device is configured to control, in response to the first switching signal, the touch terminal to stop touch scan performed at the first touch scan frequency.

In one embodiment, the reception device includes a first connection device and a first detection and determination device. The first connection device is configured to determine that the user receives the voice call. The first detection and determination device is configured to: detect a distance between the user and the touch terminal, and determine that the user receives the voice call via the earpiece of the touch terminal if it is determined that the distance between the user and the touch terminal is less than a preset distance.

In one embodiment, the reception device includes a second connection device and a second detection and determination device. The second connection device is configured to determine that the user receives the voice call. The second detection and determination device is configured to: determine whether the user turns on a speaker of the touch terminal; and determine, that the user receives the voice call via the earpiece of the touch terminal in a case that the user does not turn on the speaker of the touch terminal.

In one embodiment, the system further includes a third detection and determination device and a restoration device. The third detection and determination device is configured to determine that the user is distant from the touch terminal by determining that a distance between the user and the touch terminal is greater than a preset distance during reception of the voice call by the user via the earpiece of the touch terminal. The restoration device is configured to restore the touch terminal to the first touch scan frequency.

In one embodiment, the restoration device includes an acquisition sub-device and a selection sub-device. The acquisition sub-device is configured to acquire a second switching signal indicating that the user is distant from the touch terminal. The selection sub-device is configured to select, in response to the second switching signal, the first touch scan frequency, to control the touch terminal to switch from the second touch scan frequency to the first touch scan frequency.

A method and a system for reducing current noise of a touch terminal are provided according to the present disclosure. The method includes: determining that a user receives a voice call via an earpiece of the touch terminal, and controlling the touch terminal to switch from a first touch scan frequency to a second touch scan frequency, where the second touch scan frequency is less than the first touch scan frequency. As can be seen from the above, in a case that the user receives the voice call via the earpiece of the touch terminal, the touch terminal is controlled to switch from the first touch scan frequency to the second touch scan frequency, to effectively reduce the current noise heard by the user when the user receives the voice call via the earpiece of the touch terminal by decreasing the touch scan frequency of the touch terminal, so that the periodic current noise is outside a frequency band perceptible to a human ear, thereby improving user experience when receiving the voice call.

BRIEF DESCRIPTION OF THE DRAWINGS

The drawings to be used in the description of the embodiments are described briefly as follows. It is apparent that the drawings in the following description only illustrate some embodiments of the present disclosure.

DETAILED DESCRIPTION OF EMBODIMENTS

Embodiments of the present disclosure are described clearly and completely in conjunction with the drawings hereinafter. It is apparent that the described embodiments are only a few rather than all of the embodiments according to the present disclosure.

As described in the background, with the development of communication technologies, terminal devices (such as cellphones) are more and more popular in daily life. Further, with advances in technology, most of the existing terminal devices are touch terminals, by which human-computer interaction can be achieved by a way of touching. However, the existing touch terminals have some defects. When receiving a voice call with an ear being close to the touch terminal, a user often hear a "hissing" current noise, which results in a decreased user experience when receiving the voice call.

In one embodiment, in the existing touch terminal, a touch display panel is electrically connected to a control mainboard via a flexible circuit board. A number of boost capacitive elements and voltage stabilizing capacitive elements are arranged on the flexible circuit board. In a case that a touch scan frequency currently used by the touch terminal is applied to the capacitive elements, the laminated structure of the capacitive elements and devices of the touch terminal may produce a cavity effect, such that in a quiet environment, a "hissing" current noise can be heard by the user when the ear is close to the touch terminal. The current noise reaches a degree perceptible to the ear, and results in a decreased user experience when receiving the voice call.

Based on the above, a method and a system for reducing current noise of a touch terminal are provided according to the present disclosure, with which the current noise that heard by the user when the user receives the voice call via the earpiece of the touch terminal can be effectively reduced, thereby improving user experience when receiving the voice call.

Figure 1:
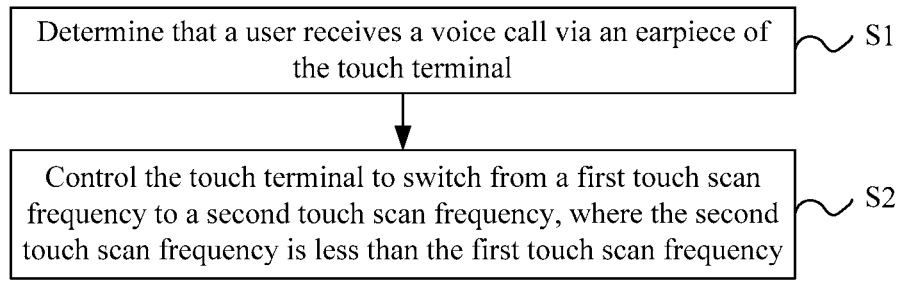
FIG. 1 is a flowchart of a method for reducing current noise of a touch terminal according to one embodiment of the present disclosure.

Reference is made to FIG. 1, which is a flowchart of a method for reducing current noise of a touch terminal according to one embodiment of the present disclosure. The method includes the following steps S1 to S2.

In step S1, it is determined that a user receives a voice call via an earpiece of the touch terminal.

In step S2, the touch terminal is controlled to switch from a first touch scan frequency to a second touch scan frequency. The second touch scan frequency is less than the first touch scan frequency.

It should be noted that, in the embodiments of the present disclosure, the first touch scan frequency is used by the touch terminal during common operation. That is, the first touch scan frequency is used by the touch terminal in a case that the user receives the voice call without the earpiece or uses the touch terminal to perform common operation. A better touch performance of the touch terminal can be ensured at the first touch scan frequency. Further, according to one embodiment of the present disclosure, the second touch scan frequency is less than the first touch scan frequency. The touch performance level of the touch terminal at the second touch scan frequency is lower than that at the first touch scan frequency.

In one embodiment of the present disclosure, scan is performed by the touch terminal in a time-sharing manner, namely, display scan and touch scan are alternately performed. According to one embodiment of the present disclosure, display scan and touch scan may be performed at a frequency of 684 Hz. Further, according to one embodiment of the present disclosure, the first touch scan frequency may be 120 Hz, and the second touch scan frequency may be 60 Hz or 0 Hz, which are not limited herein.

According to one embodiment of the present disclosure, when a user receives a voice call, it is first determined whether the user receives the voice call via the earpiece of the touch terminal. The voice call received by the user may be an incoming call or a voice message from a chat application, which is not limited herein. If it is determined that the user receives the voice call via the earpiece of the touch terminal, which indicates that the ear is close to the touch terminal, the touch terminal is controlled to switch from the currently used first touch scan frequency to the second touch scan frequency, so as to avoid the current noise heard by the user. By reducing the touch scan frequency, the problem of large current noise can be solved, so that the periodic current noise is outside a frequency band perceptible to the ear, thereby improving user experience when receiving the voice call. Further, if it is determined that the user receives the voice call via the speaker of the touch terminal rather than the earpiece of the touch terminal, the ear does not need to be close to the touch terminal. Therefore, the currently used first touch scan frequency is maintained, thereby ensuring the high touch performance of the touch terminal during reception of the voice call.

Figure 2:
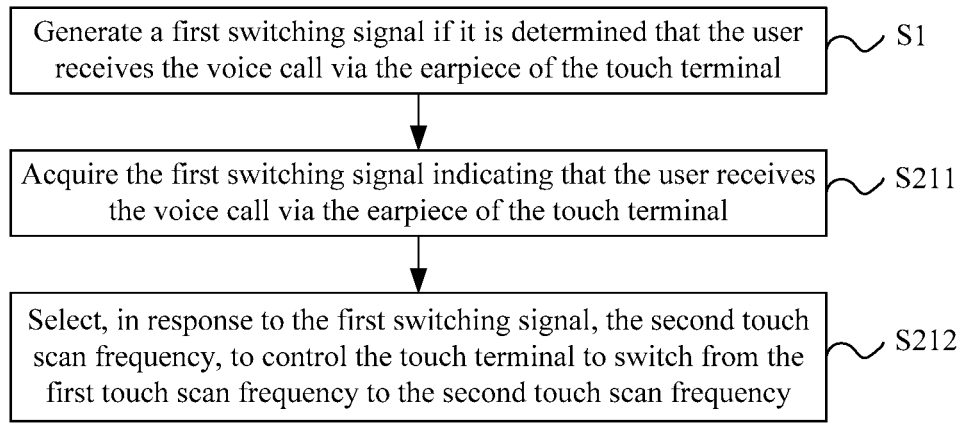
FIG. 2 is a flowchart of a method for reducing current noise of a touch terminal according to another embodiment of the present disclosure.

In one embodiment of the present disclosure, in a case that the touch terminal is controlled to switch from the first touch scan frequency to the second touch scan frequency, information on the second touch scan frequency may be prestored in a memory device of the touch terminal. If it is determined that the user receives the voice call via the earpiece of the touch terminal, the touch terminal may be controlled to select the second touch scan frequency to perform touch scan. Reference is made to FIG. 2, which is a flowchart of a method for reducing current noise of a touch terminal according to another embodiment of the present disclosure. As shown in FIG. 2, the method may include the following steps S1 to S2. In step S1, a first switching signal is generated if it is determined that the user receives the voice call via the earpiece of the touch terminal.

In step S2, the touch terminal is controlled to switch from the first touch scan frequency to the second touch scan frequency by performing the following substeps S211 to S212.

In substep S211, the first switching signal is acquired. The first switching signal indicates that the user receives the voice call via the earpiece of the touch terminal.

In substep S212, the second touch scan frequency is selected in response to the first switching signal, to control the touch terminal to switch from the first touch scan frequency to the second touch scan frequency. According to one embodiment of the present disclosure, the second touch scan frequency may be not equal to 0.

It should be understood that, according to one embodiment of the present disclosure, the touch terminal is controlled to switch from the first touch scan frequency to the second touch scan frequency in the following manner. The first switching signal is first generated if it is determined that the user receives the voice call via the earpiece of the touch terminal. After the first switching signal is acquired, the second touch scan frequency is selected, to control the touch terminal to switch from the currently used first touch scan frequency to the second touch scan frequency for performing touch scan in response to the first switching signal. Information on the first touch scan frequency and the information on the second touch scan frequency are prestored in the memory device of the touch terminal. In this case, after the first switching signal is acquired, a control device can select the second touch scan frequency and transmit the information on the second touch scan frequency to a touch scan circuit of the touch terminal, so that the touch scan circuit performs touch scan at the second touch scan frequency.

Figure 3:
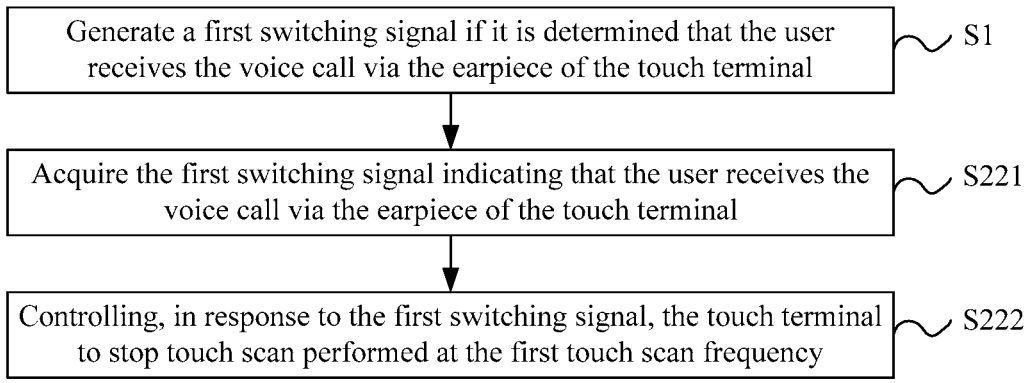
FIG. 3 is a flowchart of a method for reducing current noise of a touch terminal according to another embodiment of the present disclosure.

In one embodiment of the present disclosure, the second touch scan frequency may be 0, that is, the touch scan function of the touch terminal may be disabled in a case that the user receives the voice call via the earpiece of the touch terminal. Reference is made to FIG. 3, which is a flowchart of a method for reducing current noise of a touch terminal according to another embodiment of the present disclosure. As shown in FIG. 3, the method may include the following steps S1 to S2. In step S1, a first switching signal is generated if it is determined that the user receives the voice call via the earpiece of the touch terminal.

In step S2, the second touch scan frequency is 0, and the touch terminal is controlled to switch from the currently used first touch scan frequency to the second touch scan frequency by performing the following substeps S221 to S222.

In substep S221, the first switching signal is acquired. The first switching signal indicates that the user receives the voice call via the earpiece of the touch terminal In substep S222, the touch terminal is controlled to stop touch scan performed at the first touch scan frequency in response to the first switching signal.

It should be understood that, according to one embodiment of the present disclosure, the touch terminal is controlled to switch from the first touch scan frequency to the second touch scan frequency in the following manner. The first switching signal is first generated if it is determined that the user receives the voice call via the earpiece of the touch terminal. After the first switching signal is acquired, the second touch scan frequency is selected to control the touch terminal to switch from the currently used first touch scan frequency to the second touch scan frequency in response to the first switching signal. Since the second touch scan frequency is 0, the touch scan function of the touch terminal is disabled. Information on the first touch scan frequency and information on the second touch scan frequency of 0 are prestored in the memory device of the touch terminal. In this case, after the first switching signal is acquired, the control device selects the second touch scan frequency and transmit the information on the second touch scan frequency to the touch scan circuit of the touch terminal, to turn off the touch scan circuit of the touch terminal, so as to disable the touch scan function of the touch terminal.

Figure 4:
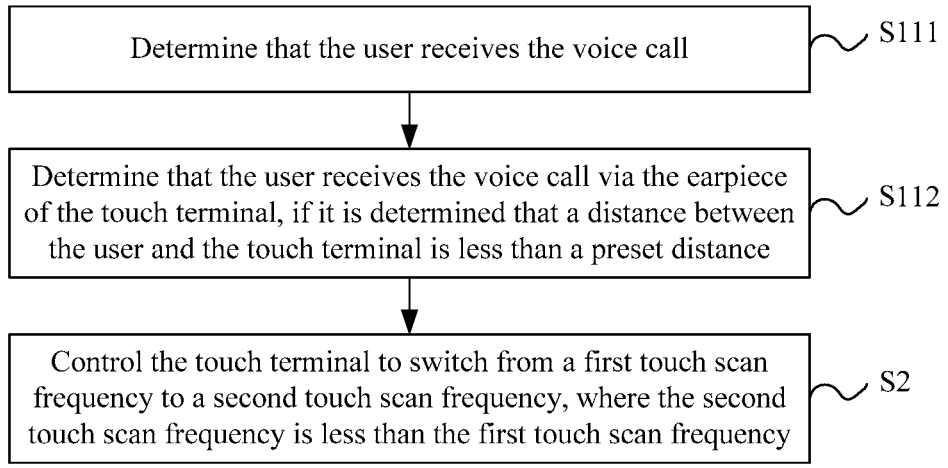
FIG. 4 is a flowchart of a method for reducing current noise of a touch terminal according to another embodiment of the present disclosure.

In one embodiment of the present disclosure, a distance between the user and the touch terminal is detected to determine whether the user receives the voice call via the earpiece of the touch terminal. Reference is made to FIG. 4, which is a flowchart of a method for reducing current noise of a touch terminal according to another embodiment of the present disclosure. As shown in FIG. 4, in step S1, whether the user receives the voice call via the earpiece of the touch terminal is determined by performing the following substeps S111 to S112.

In substep S111, it is determined that the user receives the voice call.

In substep S112, it is determined that the user receives the voice call via the earpiece of the touch terminal, if it is determined that the distance between the user and the touch terminal is less than a preset distance.

It should be understood that, if it is determined that the user receives the voice call, for example, the user receives an incoming call or a voice message, the distance between the user and the touch terminal may be detected. If it is determined that the distance between the user and the touch terminal is less than the preset distance, it is indicated that the user is close to the touch terminal to receive the voice call, and it can be determined that the user receives the voice call via the earpiece of the touch terminal.

In one embodiment, an optical sensor is provided on the touch terminal. The optical sensor may be arranged on the earpiece side of the touch terminal. Since the ear of the user is close to the earpiece when the user receives the voice call via the earpiece of the touch terminal, the optical sensor can acquire information on the distance between the user and the touch terminal. The acquired distance is compared with the preset distance. In this way, it can be determined that the user receives the voice call via the earpiece of the touch terminal.

Further, according to one embodiment of the present disclosure, in substep S111, the user receiving the voice call may be determined based on a click performed by the user on an answer key on a display interface of the touch terminal or based on user-defined information such as an answer gesture, which is not limited herein.

Figure 5:
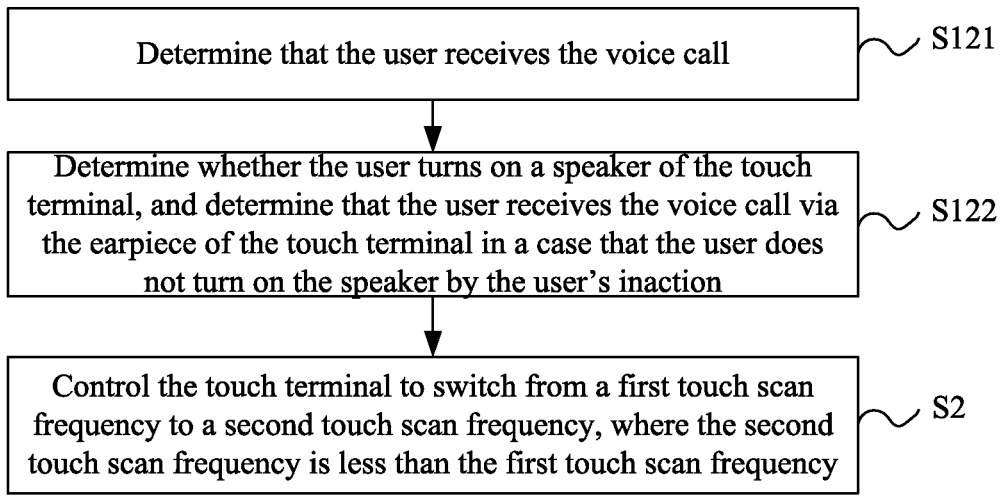
FIG. 5 is a flowchart of a method for reducing current noise of a touch terminal according to another embodiment of the present disclosure.

In one embodiment of the present disclosure, whether the user receives the voice call via the earpiece of the touch terminal is determined by determining whether the user turns on the speaker of the touch terminal. Reference is made to FIG. 5, which is a flowchart of a method for reducing current noise of a touch terminal according to another embodiment of the present disclosure. As shown in FIG. 5, in step S1, whether the user receives the voice call via the earpiece of the touch terminal is determined by performing the following substeps S121 to S122.

In substep S121, it is determined that the user receives the voice call.

In substep S122, if it is determined that the user does not turn on the speaker of the touch terminal, it is determined that the user receives the voice call via the earpiece of the touch terminal.

It should be understood that, if it is determined that the user receives the voice call, for example, the user receives an incoming call or a voice message, it may be detected whether the user operates the touch terminal to turn on the speaker to receive the voice call. If it is determined that the user does not operate the touch terminal to turn on the speaker, it is determined that the user receives the voice call via the earpiece of the touch terminal.

In one embodiment, in substep S121, the user receiving the voice call may be determined based on a click performed by the user on an answer key on a display interface of the touch terminal or based on user-defined information such as an answer gesture, which is not limited herein.

Figure 6:
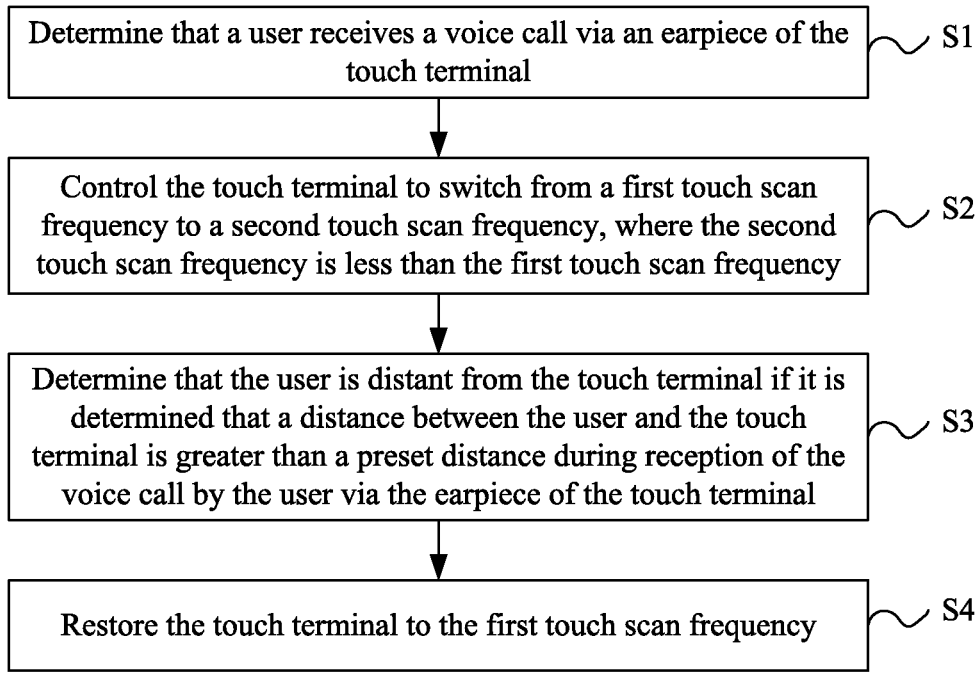
FIG. 6 is a flowchart of a method for reducing current noise of a touch terminal according to another embodiment of the present disclosure.

Further, according to one embodiment of the present disclosure, during reception of the voice call by the user via the earpiece of the touch terminal, the touch terminal may be controlled to switch from the currently used second touch scan frequency to the first touch scan frequency based on actual demand. Reference is made to FIG. 6, which is a flowchart of a method for reducing current noise of a touch terminal according to another embodiment of the present disclosure. After step S2, the method may further include steps S3 to S4.

In Step S3, during reception of the voice call by the user via the earpiece of the touch terminal, if it is determined that a distance between the user and the touch terminal is greater than a preset distance, it is determined that the user is distant from the touch terminal.

In Step S4, the touch terminal is restored to the first touch scan frequency.

It should be understood that, in a case that the user receives the voice call via the earpiece of the touch terminal, the touch terminal performs touch scan at the second touch scan frequency, which may affect the touch performance of the touch terminal. In order that the user can operate the touch terminal during reception of the voice call via the earpiece of the touch terminal, for example, the user needs to click some touch keys of the touch terminal when the user receives the voice call via the earpiece of the touch terminal, the user moves the touch terminal away from the ear. Therefore, if it is determined that the distance between the user and the touch terminal is greater than the preset distance during reception of the voice call by the user via the earpiece of the touch terminal, it can be determined that the touch terminal is distant from the ear of the user. In this case, the touch terminal is restored to the first touch scan frequency to perform touch scan, that is, the touch terminal is controlled to switch from the second touch scan frequency to the first touch scan frequency, thereby ensuring touch performance of the touch terminal.

In one embodiment, an optical sensor can be provided on the touch terminal. The optical sensor may be arranged on the earpiece side of the touch terminal. During reception of the voice call by the user via the earpiece of the touch terminal, the optical sensor acquires information on the distance between the user and the touch terminal. The distance is compared with the preset distance to determine whether the user is distant from the touch terminal.

Further, in one embodiment, in order to ensure the accuracy in determining that the user moves the touch terminal away from the ear to operate the touch terminal during reception of the voice call by the user via the earpiece of the touch terminal, the touch terminal may be further provided with an auxiliary system, such as a face detection system or an eyeball tracking system. If it is determined that the user faces the touch terminal through the auxiliary system, it is determined that the user moves the touch terminal away from the ear to operate the touch terminal during reception of the voice call by the user via the earpiece of the touch terminal.

In one embodiment of the present disclosure, the restoring the touch terminal to the first touch scan frequency includes: acquiring a second switching signal indicating that the user is distant from the touch terminal, and selecting, in response to the second switching signal, the first touch scan frequency, to control the touch terminal to switch from the second touch scan frequency to the first touch scan frequency.

It should be understood that, according to one embodiment of the present disclosure, the touch terminal is controlled to switch from the second touch scan frequency to the first touch scan frequency in the following manner. The second switching signal is first generated in a case that the user is distant from the touch terminal during reception of the voice call by the user via the earpiece of the touch terminal. After the second switching signal is acquired, the first touch scan frequency is selected to control the touch terminal to switch from the currently used second touch scan frequency to the first touch scan frequency in response to the second switching signal, to perform touch scan. The information on the first touch scan frequency and the information on the second touch scan frequency are prestored in the memory device of the touch terminal. In this case, after the second switching signal is acquired, the control device can select the first touch scan frequency and transmit the information on the first touch scan frequency to the touch scan circuit of the touch terminal, so that the touch scan circuit performs touch scan at the first touch scan frequency.

Figure 7:
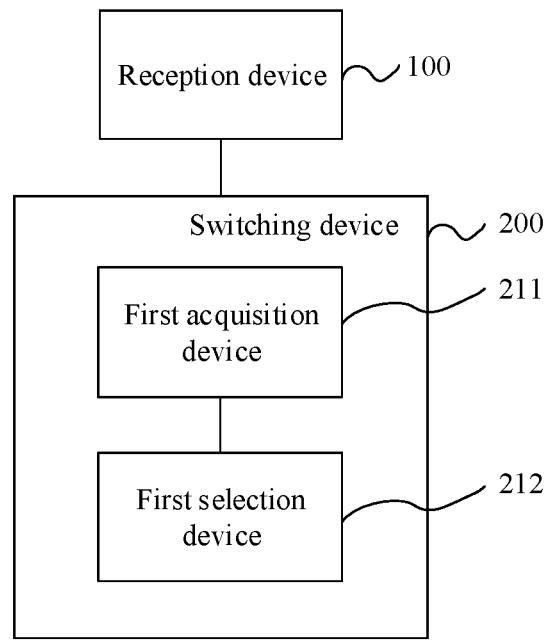
FIG. 7 is a schematic structural diagram of a system for reducing current noise of a touch terminal according to one embodiment of the present disclosure.

Correspondingly, a system for reducing current noise of a touch terminal is further provided according to the embodiments of the present disclosure. Reference is made to FIG. 7, which is a schematic structural diagram of a system for reducing current noise of a touch terminal according to an embodiment of the present disclosure. The system includes a reception device 100 and a switching device 200.

The reception device 100 is configured to determine whether a user receives a voice call via an earpiece of the touch terminal.

The switching device 200 is configured to control the touch terminal to switch from a currently used first touch scan frequency to a second touch scan frequency if it is determined that the user receives the voice call via the earpiece of the touch terminal. The second touch scan frequency is less than the first touch scan frequency.

In one embodiment of the present disclosure, as shown in FIG. 7, the switching device 200 may include a first acquisition device 211 and a first selection device 212.

The first acquisition device 211 is configured to acquire a first switching signal indicating that the user receives the voice call via the earpiece of the touch terminal.

The first selection device 212 is configured to select, in response to the first switching signal, the second touch scan frequency, to control the touch terminal to switch from the first touch scan frequency to the second touch scan frequency.

Figure 8:
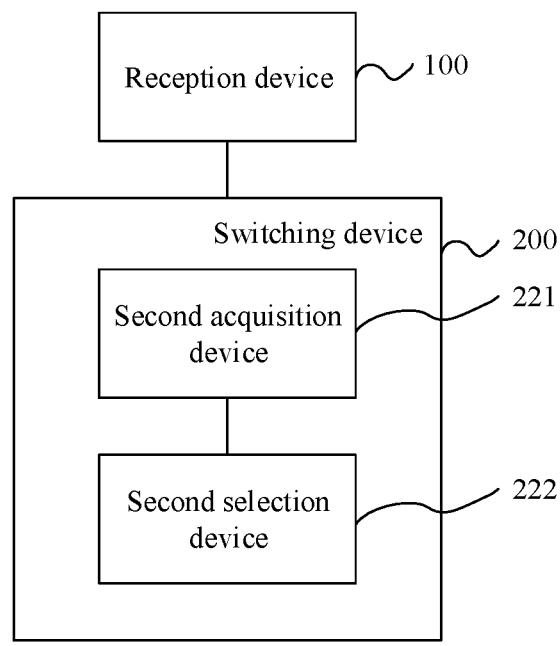
FIG. 8 is a schematic structural diagram of a system for reducing current noise of a touch terminal according to another embodiment of the present disclosure.

Reference is made to FIG. 8, which is a schematic structural diagram of a system for reducing current noise of a touch terminal according to another embodiment of the present disclosure. According to one embodiment of the present disclosure, the switching device 200 includes a second acquisition device 221 and a second selection device 222.

The second acquisition device 221 is configured to acquire a first switching signal indicating that the user receives the voice call via the earpiece of the touch terminal.

The second selection device 222 is configured to control, in response to the first switching signal, the touch terminal to stop touch scan performed at the first touch scan frequency. The second touch scan frequency is 0.

It should be understood that, according to one embodiment of the present disclosure, each of the first selection device and the second selection device may be a selector, and the touch terminal further includes a memory storing information on the first touch scan frequency and information on the second touch scan frequency. A switching signal generated in a case that the user receives the voice call via the earpiece of the touch terminal is acquired by the acquisition device, and then transmitted to the selector. The selector is controlled to select the second touch scan frequency in the memory and transmit the second touch scan frequency to the touch scan circuit of the touch terminal, so that the touch scan circuit performs touch scan at the second touch scan frequency.

Figure 9:
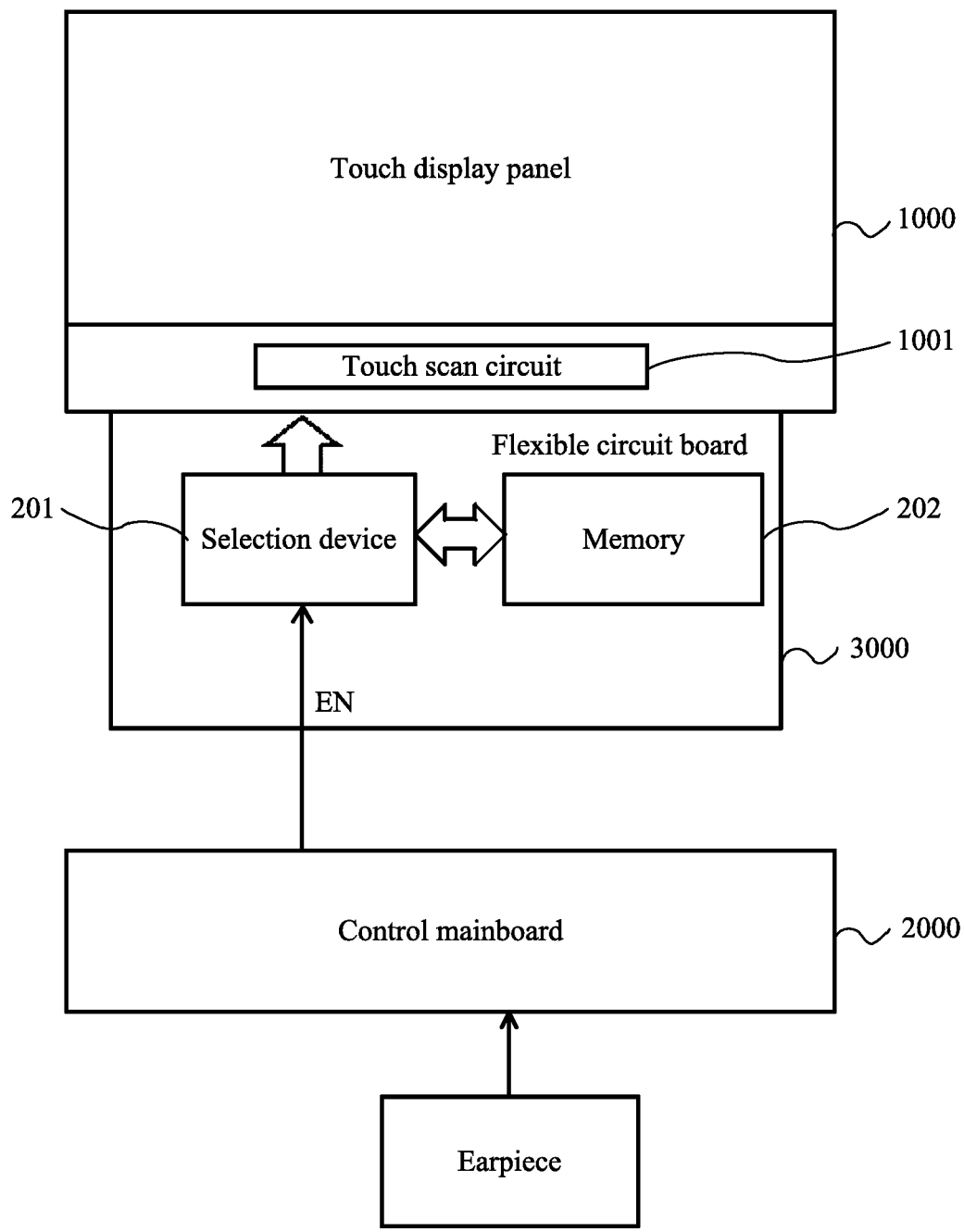
FIG. 9 is a schematic structural diagram of a touch terminal according to one embodiment of the present disclosure.

In one embodiment of the present disclosure, referring to FIG. 9, which is a schematic structural diagram of a touch terminal according to an embodiment of the present disclosure, the touch terminal includes a flexible circuit board 3000 via which a touch display panel 1000 is connected to a control mainboard 2000, a selection device 201 (including the first selection device and the second selecting device) and a memory 202 storing the information on the first touch scan frequency and the information on the second touch scan frequency are arranged on the flexible circuit board 3000, the touch scan circuit 1001 of the touch terminal is integrated on the display panel 1000, and the first switching signal EN may be transmitted from the control mainboard 2000 to the selection device 201, all of which are not limited herein.

In one embodiment of the present disclosure, a distance between the user and the touch terminal may be detected to determine whether the user receives the voice call via the earpiece of the touch terminal. According to one embodiment of the present disclosure, the reception device includes a first connection device and a first detection and determination device.

The first connection device is configured to determine that the user receives the voice call.

The first detection and determination device is configured to: detect a distance between the user and the touch terminal, and determine that the user receives the voice call via the earpiece of the touch terminal in a case that the distance between the user and the touch terminal is less than the preset distance.

In one embodiment of the present disclosure, whether the user receives the voice call via the earpiece of the touch terminal is determined by determining whether the user turns on a speaker of the touch terminal. According to one embodiment of the present disclosure, the reception device may include a second connection device and a second detection and determination device.

The second connection device is configured to determine that the user receives the voice call.

The second detection and determination device is configured to: detect whether the user turns on the speaker of the touch terminal, and determine that the user receives the voice call via the earpiece of the touch terminal in a case that the user does not turn on the speaker of the touch terminal.

Further, in order to ensure the accuracy in determining that the user moves the touch terminal away from the ear to operate the touch terminal during reception of the voice call by the user via the earpiece of the touch terminal, the touch terminal may be further provided with an auxiliary system, such as a face detection system or an eyeball tracking system. If it is determined that the user faces the touch terminal through the auxiliary system, it is determined that the user moves the touch terminal away from the ear to operate the touch terminal during reception of the voice call by the user via the earpiece of the touch terminal.

Further, according to one embodiment of the present disclosure, during reception of the voice call by the user via the earpiece of the touch terminal, the touch terminal is controlled to switch from the currently used second touch scan frequency to the first touch scan frequency based on actual demands. According to one embodiment of the present disclosure, the system further includes a third detection and determination device and a restoration device.

The third detection and determination device is configured to determine that the user is distant from the touch terminal by determining that a distance between the user and the touch terminal is greater than a preset distance during reception of the voice call by the user via the earpiece of the touch terminal.

The restoration device is configured to restore the touch terminal to the first touch scan frequency.

In one embodiment of the present disclosure, the restoration device includes an acquisition sub-device and a selection sub-device.

The acquisition sub-device is configured to acquire a second switching signal indicating that the user is distant from the touch terminal.

The selection sub-device is configured to select, in response to the second switching signal, the first touch scan frequency, to control the touch terminal to switch from the second touch scan frequency to the first touch scan frequency.

In any one of the above embodiments of the present disclosure, the touch panel of the touch terminal may be an In-Cell touch panel, an On-Cell touch panel, a self-capacitive touch panel or a mutual capacitive touch panel, which is not limited herein.

A method and a system for reducing current noise of a touch terminal are provided according to the present disclosure. The method includes: determining that a user receives a voice call via an earpiece of the touch terminal, and controlling the touch terminal to switch from a first touch scan frequency to a second touch scan frequency, where the second touch scan frequency is less than the first touch scan frequency. As can be seen from the above, in a case that the user receives the voice call via the earpiece of the touch terminal, the touch terminal is controlled to switch from the first touch scan frequency to the second touch scan frequency, to effectively reduce the current noise heard by the user when the user receives the voice call via the earpiece of the touch terminal by decreasing the touch scan frequency of the touch terminal, so that the periodic current noise is outside a frequency band perceptible to a human ear, thereby improving user experience when receiving the voice call.

The invention claimed is:

1. A system for reducing current noise of a touch terminal, comprising:
a reception device configured to determine whether a user receives a voice call via an earpiece of a touch terminal; and
a switching device configured to control, if it is determined that the user receives the voice call via the earpiece of the touch terminal, the touch terminal to switch from a first touch scan frequency to a second touch scan frequency, wherein the second touch scan frequency is less than the first touch scan frequency,
wherein the reception device comprises:
a second connection device configured to determine that the user receives the voice call, and
a second detection and determination device configured to: determine whether the user turns on a speaker of the touch terminal; and determine, that the user receives the voice call via the earpiece of the touch terminal in a case that the user does not turn on the speaker of the touch terminal.

2. The system for reducing current noise of a touch terminal according to claim 1, wherein the switching device comprises:
a first acquisition device configured to acquire a first switching signal indicating that the user receives the voice call via the earpiece of the touch terminal, and
a first selection device configured to select, in response to the first switching signal, the second touch scan frequency, to control the touch terminal to switch from the first touch scan frequency to the second touch scan frequency.

3. The system for reducing current noise of a touch terminal according to claim 1, wherein the switching device comprises:
a second acquisition device configured to acquire a first switching signal indicating that the user receives the voice call via the earpiece of the touch terminal, and
a second selection device configured to control, in response to the first switching signal, the touch terminal to stop touch scan performed at the first touch scan frequency.

4. The system for reducing current noise of a touch terminal according to claim 1, wherein the reception device comprises:
a first connection device configured to determine that the user receives the voice call, and
a first detection and determination device configured to: detect a distance between the user and the touch terminal, and determine that the user receives the voice call via the earpiece of the touch terminal if it is determined that the distance between the user and the touch terminal is less than a preset distance.

5. The system for reducing current noise of a touch terminal according to claim 1, further comprising:
a third detection and determination device configured to determine that the user is distant from the touch terminal by determining that a distance between the user and the touch terminal is greater than a preset distance during reception of the voice call by the user via the earpiece of the touch terminal; and
a restoration device configured to restore the touch terminal to the first touch scan frequency.

6. The system for reducing current noise of a touch terminal according to claim 5, wherein the restoration device comprises:
an acquisition sub-device configured to acquire a second switching signal indicating that the user is distant from the touch terminal, and
a selection sub-device configured to select, in response to the second switching signal, the first touch scan frequency, to control the touch terminal to switch from the second touch scan frequency to the first touch scan frequency.

* * * * *